(12) United States Patent
Chitrapu et al.

(10) Patent No.: US 11,416,826 B2
(45) Date of Patent: Aug. 16, 2022

(54) PRODUCTIVITY ENTITY CONTAINERS AND UNIFIED VIEW INTERFACE FOR DIFFERENT PRODUCTIVITY ENTITY TYPES

(71) Applicant: Microsoft Technology Licensing, LLC, Redmond, WA (US)

(72) Inventors: Sriram M. Chitrapu, Bellevue, WA (US); Ramesh Kuchibhatla, Sammamish, WA (US); Raghu Chinagudabha, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/154,440

(22) Filed: Jan. 21, 2021

(65) Prior Publication Data

US 2022/0230144 A1    Jul. 21, 2022

(51) Int. Cl.
*G06Q 10/00* (2012.01)
*G06Q 10/10* (2012.01)
(Continued)

(52) U.S. Cl.
CPC ....... *G06Q 10/1093* (2013.01); *G06F 3/0481* (2013.01); *G06F 3/14* (2013.01); *G06Q 10/06314* (2013.01); *G06Q 10/107* (2013.01)

(58) Field of Classification Search
None
See application file for complete search history.

(56) References Cited

U.S. PATENT DOCUMENTS 8,019,632 B2    9/2011   Niheu et al.
9,317,825 B2*   4/2016   Defusco ............ G06Q 10/1093
(Continued)

FOREIGN PATENT DOCUMENTS

WO    2017205305 A1    11/2017

OTHER PUBLICATIONS

Cohen, Jason, 12 Google Calendar Tricks Your Probably Not Using, Jan. 27, 2019, PC Magazine, https://www.pcmag.com/news/12-google-calendar-tricks-youre-probably-not-using, p. 1-17. (Year: 2019).*

(Continued)

*Primary Examiner* — Joseph M Waesco
(74) *Attorney, Agent, or Firm* — NovoTechIP International PLLC

(57) ABSTRACT

A productivity entity container data structure is created that includes information for a first productivity entity and a link to a second productivity entity. The information for the first productivity entity includes either a link to the first productivity entity or details for the first productivity entity stored directly in the productivity entity container data structure. The first productivity entity and the second productivity entity are of different productivity entity types (e.g., an assigned task associated with a scheduled calendar event). By using the productivity entity container data structure to link together multiple different productivity entities of different productivity entity types, computer-based productivity systems are configured to directly access and display information for related productivity entities of different productivity entity types in a unified-view interface.

15 Claims, 8 Drawing Sheets

US 11,416,826 B2

Page 2

(51) Int. Cl.
  *G06F 3/0481* (2022.01)
  *G06F 3/14* (2006.01)
  *G06Q 10/06* (2012.01)

(56) References Cited

U.S. PATENT DOCUMENTS

| | | | |
|---|---|---|---|
| 10,504,069 B2 | 12/2019 | Gowru et al. | |
| 10,691,292 B2 | 6/2020 | Lu et al. | |
| 11,195,126 B2* | 12/2021 | Fowler | G06Q 10/1095 |
| 2004/0139435 A1 | 7/2004 | Cui et al. | |
| 2005/0038687 A1* | 2/2005 | Galdes | G06Q 10/107 709/206 |
| 2005/0057584 A1* | 3/2005 | Gruen | G06Q 10/107 715/752 |
| 2007/0112926 A1 | 5/2007 | Brett et al. | |
| 2008/0155547 A1 | 6/2008 | Weber et al. | |
| 2008/0177609 A1 | 7/2008 | Grieb et al. | |
| 2009/0119606 A1 | 5/2009 | Gilbert | |
| 2009/0125831 A1* | 5/2009 | Dandurand | G06F 3/0481 715/772 |
| 2012/0032945 A1* | 2/2012 | Dare | G06F 3/0488 345/418 |
| 2014/0035949 A1 | 2/2014 | Singh et al. | |
| 2014/0136518 A1 | 5/2014 | Shum et al. | |
| 2014/0236663 A1 | 8/2014 | Smith et al. | |
| 2015/0347586 A1 | 12/2015 | Fasen et al. | |
| 2016/0086116 A1* | 3/2016 | Rao | G06F 3/0481 705/7.21 |
| 2017/0270535 A1* | 9/2017 | McKee | G06Q 10/10 |
| 2017/0329466 A1* | 11/2017 | Krenkler | G06F 40/30 |
| 2018/0081496 A1* | 3/2018 | Bhardwaj | G06F 3/0481 |
| 2018/0330333 A1* | 11/2018 | Gowru | G06F 3/0482 |
| 2018/0330334 A1* | 11/2018 | Gowru | G06Q 10/1093 |
| 2019/0317643 A1* | 10/2019 | Bhardwaj | G06F 3/0481 |
| 2020/0356224 A1* | 11/2020 | Wilson | G06F 3/04845 |
| 2021/0377388 A1* | 12/2021 | Degeorgis | H04M 3/42059 |
| 2022/0083584 A1* | 3/2022 | Javier | H04N 5/232935 |

OTHER PUBLICATIONS

"Associate Tasks with a Calendar Appointment or Meeting", Retrieved From: https://web.archive.org/web/20200927083532/https:/www.msoutlook.info/question/associate-tasks-with-calendar-appointment-or-meeting, Sep. 27, 2020, 1 Page.

Lyons, Kim, "Facebook Begins Merging Instagram and Messenger Chats in New Update", Retrieved From: https://www.theverge.com/2020/8/14/21369737/facebook-merging-instagram-messenger-chats-update, Aug. 14, 2020, 2 Pages.

"International Search Report and Written Opinion Issued in PCT Application No. PCT/US21/062724", dated Apr. 5, 2022, 10 Pages.

* cited by examiner

PRODUCTIVITY ENTITY CONTAINERS AND UNIFIED VIEW INTERFACE FOR DIFFERENT PRODUCTIVITY ENTITY TYPES

FIELD

Embodiments described herein relate to systems and methods for providing computer-based productivity systems including, for example, email, calendar, and tasks.

SUMMARY

The use of computer-based productivity systems such as, for example, email, calendars, and tasks (e.g., to-do lists) is ubiquitous across consumer, enterprise, and other organizations (e.g., education, government, hospitals, businesses, etc.). These productivity systems are often accessed and managed through an electronic computing device such as, for example, desktop computers, laptop computers, and mobile computing devices (e.g., smart phones, tablet computers, etc.) using a software application running on the computing device, accessing a web-based or cloud-based software application, or a combination thereof.

Current electronic productivity systems often provide functionality in a disjointed fashion using disparate systems, storage mechanisms, and productivity entities (e.g., an email entity, a calendar entity, etc.) having different data structures. Accordingly, to stay on top of operations and not lose sight of impending actions, a user must collate and corroborate data scattered across multiple productivity systems. For example, when scheduling a collaborative meeting with colleagues, a user must manually ensure that tasks are created for materials and action items that need to be completed prior to a meeting, must ensure that those tasks are assigned to appropriate users, must ensure that the meeting invitations have been sent to the appropriate users (and that the invitations have been accepted), and must ensure that the various assigned tasks have been completed before the scheduled date of the meeting. Because current electronic productivity systems scatter this information (e.g., email, tasks, calendars, etc.) across different interfaces and sometimes entirely different systems, user efficiency and productivity are limited by the lack of a unified view interface and architecture. This lack of user efficiency results in inefficient use of computing resources, including processing resources, memory resources, and bandwidth resources.

In addition, although some productivity systems provide a partial solution by bundling different types of productivity entities into one system (e.g., Teams® and Outlook® provided by Microsoft Corporation), different types of productivity entities are still presented and managed separately within these systems. Accordingly, computing resources (as well as user time and effort) is wasted ensuring that productivity entities are handled properly.

In view of at least the above problems with existing computer-based productivity systems, embodiments described herein provide systems and methods for providing a common architectural platform that enables seamless flow of relevant (or "related" used herein interchangeably with "relevant") information and data insights, which are otherwise hidden and not readily presented or accessible across different productivity systems. In some implementations, different productivity entities (e.g., event entities, email entities, task entities, etc.) are linked, connected, or embedded within other productivity entities. For example, in some implementations, tasks systems and directory services systems are architecturally combined to take advantage of relevant information, data insights and functionality, user interface (UI) design, and underlying software code.

In some implementations, a new type of data structure (i.e., a container) is created and utilized by a productivity system in which one or more otherwise disjointed productivity entities are embedded or linked in the container. In some implementations, the new container is referred to herein as a "productivity entity container," which includes links to different existing productivity entities (of one or more types) to manifest and present interrelated data dependencies among the different productivity entities. In some implementations, the productivity entity container is itself a productivity entity for a particular productivity entity type and includes details of a particular productivity entity but also includes one or more links to other productivity entities. For example, a calendar entity container can directly include data for a scheduled calendar event (e.g., a date, a time, a location, etc.) as well as a link to one or more task-type productivity entities related to the calendar event.

In some implementations, with the benefit of the linking of the interrelated data provided by a productivity entity container data structure, a productivity system can provide one or more user interfaces that include data of related productivity entities of various types instead of only including data for individual productivity entities of a single productivity entity type. For example, in some implementations, a calendar view interface includes a sequence of calendar events, wherein each event corresponds to a different productivity entity data structure and, in response to receiving a user selection of a particular calendar event, further detail and information corresponding to that calendar event is provided in an event view interface. In addition, using the linking provided via a productivity entity container, selection of a particular entity (e.g., a particular calendar event) can provide access to details of related productivity entities. For example, for an event corresponding to a calendar entity container, the event view interface can also provide a unified view that, in addition to providing scheduling details for a selected event, includes a visual indication of one or more task entities associated with the event, the user to which each task is assigned, a status indicator showing the progress made on each different assigned tasks, or a combination thereof.

In addition to the benefit of a unified view of linked interrelated productivity entities, the use of the productivity entity container simplifies computational complexity. Instead of requiring additional programming code in the software to search through all available productivity entities and to determine entities that might be related to a calendar entity being viewed by a user, the productivity entity container provides a direct link to all of the related productivity entities. Additionally, because productivity systems as described herein are configured to provide a single unified view interface including data relating to multiple different productivity entity types, the productivity systems do not need to launch different user interface environments (e.g., for different productivity systems) in response to each individual user request to view data for productivity entities of different productivity entity types. By reducing computational complexity, the speed of computer processing is also enhanced. This is particularly beneficial in environments where productivity entities may be stored on different servers and accessed across a network (e.g., the Internet) where the use of the productivity entity container eliminates the need for manually or automatically searching for potentially related data structures across different network communication paths.

In some implementations, the systems and methods described herein provide one or more user interfaces to enable a user to create, view, and edit basic productivity entities (i.e., individual productivity entities that are not included in or linked to other productivity entities by a productivity entity container) and create, view, and edit productivity entity containers (i.e., individual productivity entities that are included in or linked to other productivity entities by a productivity entity container). Also, in some embodiments, the one or more user interfaces enable a user to promote an existing basic productivity entity to a productivity entity container by adding one or more dependencies to the existing basic productivity entity. In some implementations, the one or more user interfaces are also configured to provide role-based visual indicators reflecting the status of dependencies for a given productivity entity container. In some implementations, the one or more user interfaces also enable the user to configure (e.g., customize) the role-based visual indicators using either actual images, avatars, emoticons, or the like.

In some implementations, the one or more user interfaces provide a preview of dependencies associated with a productivity entity container and, in some embodiments, a status (for example, a visual icon indicative of task status for an event that is included in the calendar view interface). In some implementations, the one or more user interfaces enable a user to access completed or in-progress artifacts associated with one or more dependencies (e.g., a link to a spreadsheet that is being prepared as one of the action items for a calendar event is included in the event view interface for that event). Also, in some implementations, the one or more user interfaces enable a user to embed or link one or more productivity items to individual owners and assign an estimated times of arrival (ETA) for the assigned productivity entity (e.g., an assigned task) to the dependencies of a productivity entity container.

In some implementations, the systems and methods described herein are also configured to automatically monitor the status of a productivity entity and, using the links provided via a productivity entity container, automatically take or suggest actions for one or more related productivity entities. For example, systems and methods described here may be configured to monitor the status of one or more tasks associated with a calendar event in a calendar entity container and, in response to determining that the task will likely not be completed before the calendar event, generate an automatic rescheduling suggestion for the event (e.g., based on other calendar objects of each event participant).

In one implementation, embodiments described herein provide a method of operating a computer-based productivity system. A productivity entity container data structure is created by a computer processor and stored (e.g., to a computer-readable memory). The productivity entity container data structure includes information for a first productivity entity and a link to a second productivity entity. The information for the first productivity entity includes at least one selected from a group consisting of a link to the first productivity entity and details of the first productivity entity stored directly in the productivity entity container data structure. The first productivity entity is of a first productivity entity type while the second productivity entity is of a second productivity entity type that is different than the first productivity entity type.

For example, in some implementations, the first productivity entity is a calendar event-type productivity entity for a scheduled event and the second productivity entity is a task-type productivity entity for a task associated with the scheduled event. By linking together multiple different productivity entities of different productivity entity types, computer-based productivity systems can use the productivity entity container to directly access and display information for related productivity entities of different productivity entity types in a unified-view interface.

In another implementations, embodiments described herein provide a computer-based system comprising a computer-readable memory and an electronic processor that is coupled to the computer-readable memory and configured to execute instructions stored on the memory. The electronic processor is configured, via execution of the instructions, to create a productivity entity container data structure and store the productivity entity container data structure (e.g., to the computer-readable memory). The productivity entity container data structure includes information for a first productivity entity and a link to a second productivity entity. The information for the first productivity entity includes at least one selected from a group consisting of a link to the first productivity entity and details of the first productivity entity stored directly in the productivity entity container data structure. The first productivity entity is of a first productivity entity type while the second productivity entity is of a second productivity entity type that is different than the first productivity entity type.

In yet another implementation, embodiments described herein provide a non-transitory computer-readable memory including instructions that, when executed by an electronic processor, perform a set of functions. The set of functions includes accessing, with a computer-based calendar system, a calendar entity container, wherein the calendar entity container includes details for an event and a link to a task-type productivity entity. The task-type productivity entity is accessed with the computer-based calendar system via a computer-based task system using the link to the task-type productivity entity included in the calendar entity container. A current progress status of a task corresponding to the task-type productivity entity is determined by the computer-based calendar system based on the accessed task-type productivity entity, wherein the task is associated with the event. An event view interface is then provided within a user interface of the computer-based calendar system. The event view interface includes schedule details for the event and a graphical indication of the current progress status of the task.

DETAILED DESCRIPTION

Figure 1:
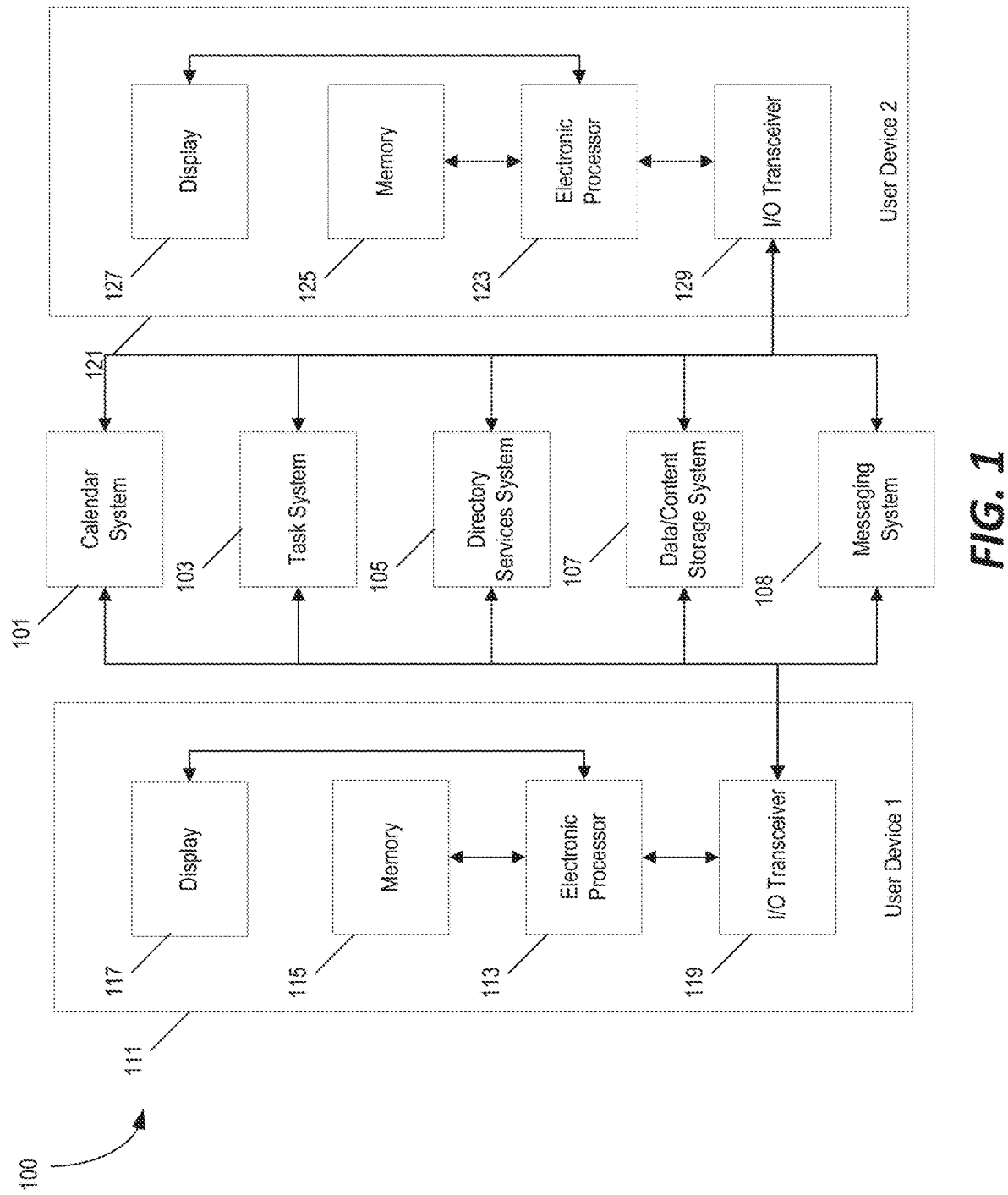
FIG. 1 is a block diagram of a network system including productivity systems communicating with user devices according to some embodiments.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not include a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

As noted above in the Summary section, an increasingly large number of productivity systems are being utilized by users of electronic devices. Examples of these productivity systems include systems for presenting and managing messages (e.g., email, instant message or chat, text, or the like), calendars, tasks, contacts, and data, such as electronic documents or other data files. These productivity systems are often configured to separately store and manage individual items (i.e. "productivity entities" such as individual emails, individual calendar events, etc.). These items are referred to herein as "productivity entities" or "productivity objects." A user of multiple different productivity systems may have productivity entities created and managed in different systems, but the productivity entities may be related to each other. For example, a user may have events scheduled in a calendar-type productivity system for a project and tasks created in a task management-type productivity system relating to the same project. Existing productivity systems are, however, configured to store, manage, and present productivity entities of a particular type and, thus, the productivity systems fail to provide any type of unified view interface in which a user is able to view and take actions with respect to related productivity entities of different productivity entity types. Accordingly, more user time is needed to separately manage and navigate productivity entities of different productivity entity types on multiple different productivity entity systems. Additionally, computational load and complexity is also increased. For example, to access a task assigned to a user and also view event details for an event related to the task, such as a scheduled meeting, separate systems may be launched or accessed (e.g., through separate applications or portals) to access calendar entities and task entities. Furthermore, once launched or accessed, these systems access and provide information for many other tasks and many other events on a user's calendar, which wastes computing resources and user time and effort. In particular, if a user is viewing a specific event within a calendar system and knows that he or she also has a task related to this event, the user must launch or access the separate task system and manually navigate within the task system to locate the relevant event.

To address these and other issues with existing computer-based productivity systems, embodiments described herein provide a novel data structure or file type (referred to herein as a "productivity entity container") that includes information regarding a productivity entity as well as a link to one or more other productivity entities of same type, of a different type, or a combination thereof. Using this container, productivity systems are able to access productivity entities of different types and present a unified view interface enabling a user to access and interact with multiple different productivity entities linked by the productivity entity container.

FIG. 1 is a block diagram of a network system 100 including multiple productivity systems communicating with multiple user devices according to some embodiments. In particular, as illustrated in FIG. 1, the network system 100 includes a calendar system 101, a task system 103, a directory services system 105, a data/content storage system 107, and a messaging system 108 (such as an email system, instant message or chat system, text system, or the like). These productivity systems 101, 103, 105, 107, 108 can be provided as separate network-accessible (e.g., Internet) systems or services. These productivity systems 101, 103, 105, 107, 108, are accessible, for example, by one or more user devices 111, 121. Each user device 111, 121 may be an electronic computing device, such as, for example, a portable electronic device (e.g., a smart phone, a tablet computer, a wearable device, or the like). The productivity systems 101, 103, 105, 107, and 108 may include one or more computing devices, such as one or more servers. It should be understood that the network system 100 can include different numbers and combinations of productivity systems and user devices and the configuration illustrated in FIG. 1 is for example purposes only. Also, the network system 100 may include additional components not illustrated, such as routers, firewalls, and other network devices (not illustrated) that allow the productivity systems 101, 103, 105, 107, 108 and the user devices 111, 121 to communicate. Furthermore, the productivity systems 101, 103, 105, 107, 108 each include one or more hardware components, such as one or more servers, that include similar components as the user devices 111, 121 as described below (e.g., an electronic processor, a non-transitory computer readable memory, and an input/output transceiver).

In the example of FIG. 1, the first user device 111 includes an electronic processor 113 and a non-transitory computer-readable memory 115. The memory 115 stores data and computer-executable instructions that are accessed and executed by the electronic processor 113 to provide functionality including, for example, functionality described herein or portions thereof. The electronic processor 113 is also communicatively coupled to an output device, such as a display 117, and an input/output transceiver 119. The first user device 111 is configured to communicate with the productivity systems 101, 103, 105, 107, 108 through the input/output transceiver 119. For example, in some implementations, the input/output transceiver 119 may include, for example, a wireless transceiver such as a Wi-Fi transceiver or a cellular phone transceiver, while, in other implementations, the input/output transceiver 119 may include a device configured for wired communication (e.g., an Ethernet card for wired communication with a network).

In some implementations, the first user device 111 is configured to access and display one or more user interfaces provided by the various productivity systems 101, 103, 105, 107, 108 through a software application (e.g., an "app") executed by the electronic processor 113, as a web-based interface accessed through a web-browser software application executed by the electronic processor 113, or a combination thereof. A user may interface with multiple different productivity systems through a single user device 111 or through different user devices. As one example, a first user can access the calendar system 101 from their smart phone (i.e., the first user device 111) and also from their desktop computer (i.e., the second user device 121). Similarly, in another example, two separate users can both access the same calendar system 101 from two different smart phones (i.e., the first user device 111 and the second user device 121). Also, in some implementations, a user device 111, 121 may be configured such that multiple different users can selectively access the productivity systems through the same user device 111.

As illustrated in FIG. 1, different user devices can access and interface with the productivity systems 101, 103, 105, 107, 108. For example, as illustrated in FIG. 1, a second user device 121 (which, like the first user device 111, includes an electronic processor 123, a non-transitory computer-readable memory 125, an output device, such as a display 127, and an input/output transceiver 129) is also configured to access and interface with the productivity systems as described above with respect to the first user device 111. As noted above, it should be understood that the productivity systems 101, 103, 105, 107, 108 can be accessed by any number of user devices and two user devices 111, 121 are illustrated in FIG. 1 as one example.

Figure 2:
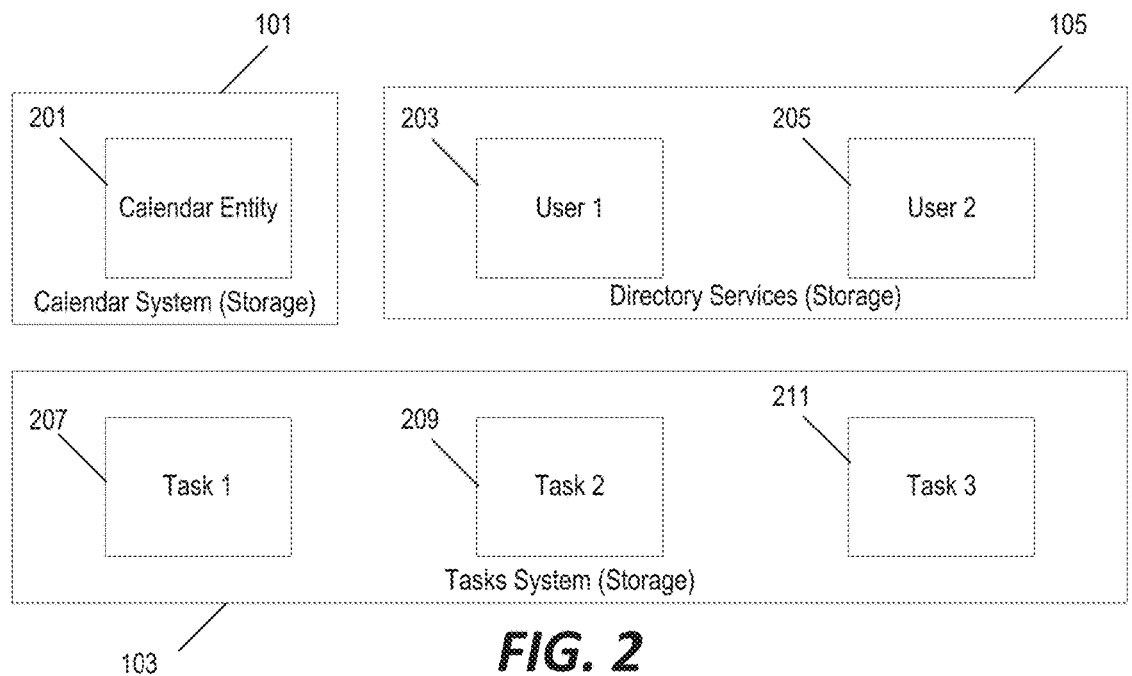
FIG. 2 is a block diagram of separate productivity entities for various types of productivity systems in the system of FIG. 1.

The productivity systems 101, 103, 105, 107, 108 are configured to create, store, and access data structures (e.g., files stored to memory) that define data for individual entities managed by the productivity system. These individual entities are referred to herein as "productivity entities." As one example, one productivity entity may include a calendar event, such as, for example, a meeting appointment stored in the calendar system 101. Another productivity entity may be a task stored in the task system 103. Other types of productivity entities may include, for example, a contact stored on the directory services system 105, a content file stored on the data/content storage system 107, and an email stored on the messaging system 108. FIG. 2 illustrates an example of a calendar entity 201 created, stored, and accessed through the calendar system 101, two user contacts 203, 205 created, stored, and accessed through the directory services system 105, and three tasks 207, 209, 211 created, stored, and accessed through the task system 103.

When a user accesses one of the productivity systems through the user device 111, 121, the user device 111, 121 (i.e., the output device, such as a display) outputs one or more user interfaces provided by the productivity system that present information regarding one or more productivity entities of the type associated with the selected productivity system. For example, when the user accesses the calendar system 101, one or more calendar event productivity entities are accessed and included in a user interface provided to the user device by the calendar system 101. In some implementations, the productivity systems are configured to store and manage a set of productivity entities associated with each different user of the system.

In some implementations, the productivity systems are separate systems while, in other implementations, a productivity system provides access to different types of productivity entities. However, in some implementations, productivity entities of different types are managed, stored, and presented separately even when using a productivity system provides access to different types of productivity entities (e.g., within separate windows or tabs or separate user interfaces). For example, a productivity system may provide separate and distinct user interfaces (or portions within a user interface) for managing calendar events, tasks, and contacts.

As described above, this separate storage and management of productivity entities by type can create technological challenges in real-world situations. For example, a group of users may want to schedule a meeting to discuss a project with action items assigned to each user that must be completed before the scheduled meeting. However, if task-type productivity entities are stored and managed separately from the event-type productivity entities, users must take manually additional steps to confirm whether the required tasks are completed before the meeting. Even in systems where event-type productivity entities and task-type productivity entities can be shared between different users, the software application running on the user device is unable to provide any type of unified interface that allows the user to simultaneously view productivity entities of various different types and manage connections between related productivity entities of various different types. Furthermore, because each separate productivity entity must be accessed separately, more computing resources are required and computing time is slowed by additional memory-access steps and general data processing.

Figure 3:
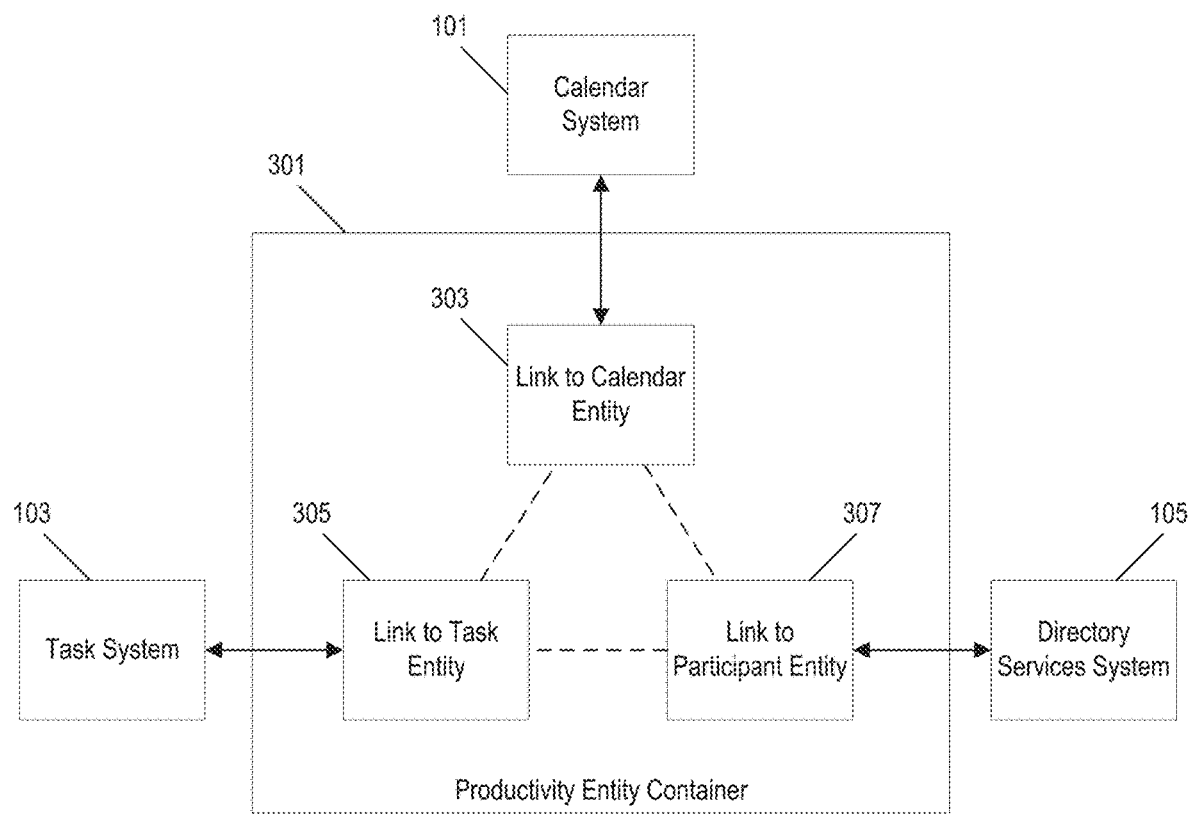
FIG. 3 is a block diagram of an example of a productivity entity container for use in the system of FIG. 1.

FIG. 3 illustrates an example of a productivity entity container 301 that solves, among other problems, the above-described problem. The productivity entity container 301 is a data structure stored to memory as a computer file and includes one or more links to productivity entities (e.g., of different types). For example, in FIG. 3, the productivity entity container 301 includes a link to a calendar entity 303, a task entity 305, and one or more participant entities 307. In some implementations, as described in more detail below with respect to FIG. 4, a productivity entity container directly stores data for a productivity entity (similar to a basic productivity entity) in addition to one or more the links to the separate individual productivity entities.

In some implementations, a productivity entity container 301 includes a link to a productivity entity in the form of a unique identifier corresponding to the productivity entity. The unique identifier may include, for example, a direct memory address where the individual productivity entity is stored, an index name/number for the individual productivity entity, and/or a universal resource locator (URL) defining both a location and an index of an individual productivity entity on a storage device connected to the network system 100 (as part of the associated productivity system). Similarly, in some implementations, when an individual productivity entity is linked by a productivity entity container (i.e., when a productivity entity container includes a link to the productivity entity), metadata is added to the productivity entity indicating that the productivity entity has been linked by a productivity entity container. The metadata may also provide or include a link to the productivity entity container. Accordingly, in some implementations, when an individual productivity entity linked by the productivity entity container is accessed within any of the productivity systems, metadata associated with the individual productivity entity can be used to directly access the productivity entity container and, in turn, any links to other related productivity entities included in the productivity entity container. For example, when an event type productivity entity linked by the productivity entity container is accessed within the calendar system 101, the calendar system 101 can use the metadata added to the event type productivity entity to access the productivity entity container and the links in the productivity entity container to directly access tasks, users, or other productivity entities associated with the event. Accordingly, this new data structure avoids the need for a user to manually access a separate productivity system (e.g., through launching a separate application or manually accessing a separate system), which reduces computational resources and improves access speed.

Figure 4:
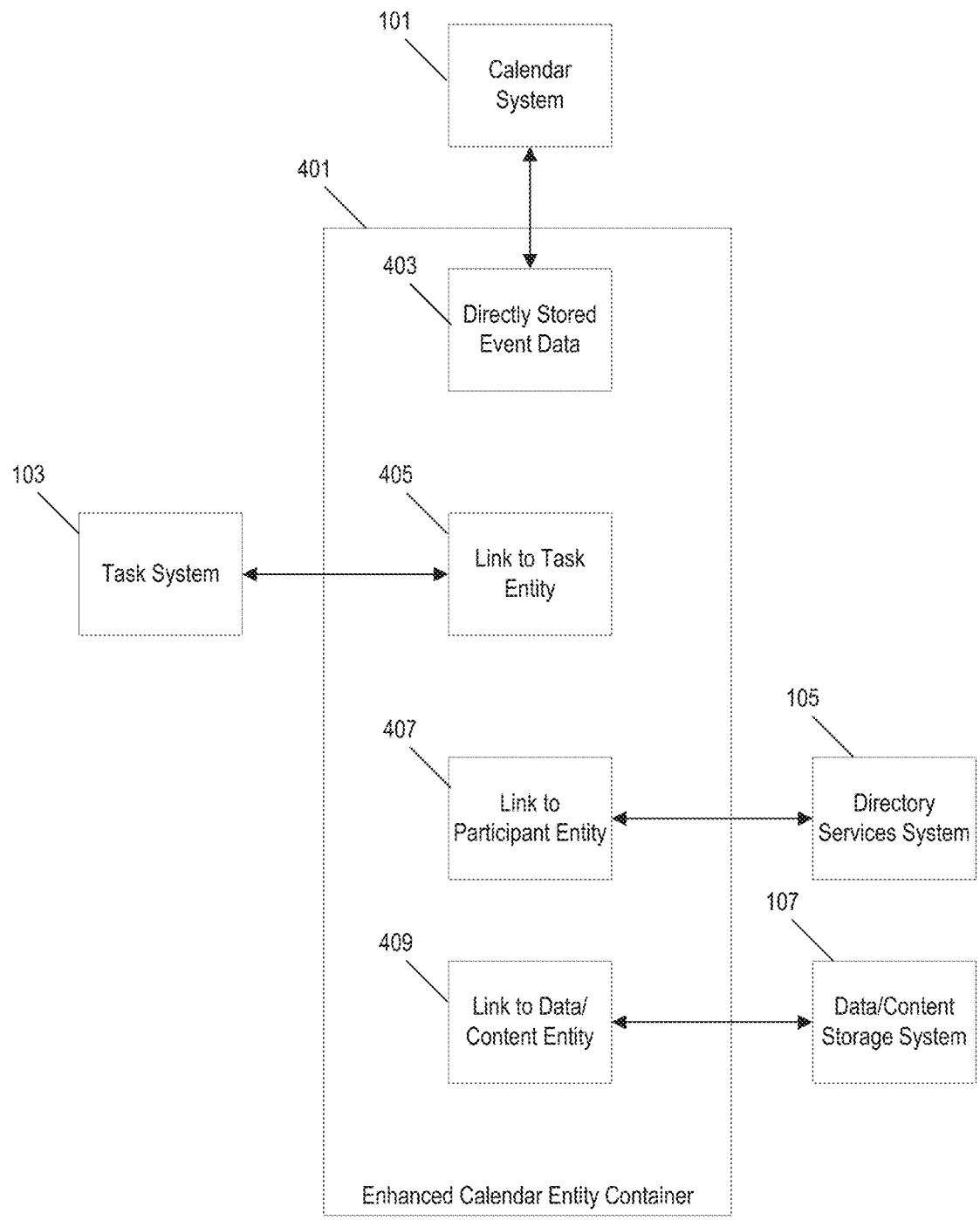
FIG. 4 is a block diagram of an example of a calendar entity container for use in the system of FIG. 1.

In the example described above, the productivity entity container 301 includes links to separate productivity entities that are associated with each other by the productivity entity container 301. However, in other implementations, instead of or in addition to linking separate productivity entities, the productivity entity container may be configured to include data associated with one or more types of productivity entities embedded directly within the productivity entity container. FIG. 4 illustrates one such example of a productivity entity container and, in particular, illustrates a calendar entity container 401. In this example, the calendar entity container 401 includes calendar event data 403 similar to a basic event-type productivity entity (e.g., a date and time of an event, a location or communication platform for the event, a name of the event, names or other identifiers of participants in the event, and/or other details of the calendar event). As described in further detail below, when accessed from the calendar system 101, details of the event (and included in the calendar entity container 401) are provided to the user, such as, for example, within a calendar view interface, an event view interface, or both (e.g., as described in further detail below). However, as noted above, in addition to the calendar event data 403, the calendar entity container 401 also includes a link to one or more other productivity entities that are related to the event represented by the calendar event data 403. For example, in the example of FIG. 4, the calendar entity container 401 includes a link to a task entity 405 accessible through the tasks system 103, a link to a participant entity 407 (i.e., a participant that was invited to the event or that is attending the event), and a link to a content entity 409 accessible through the data/content storage system 107. Accordingly, when the calendar entity container 401 is accessed by the calendar system 101, the calendar system 101 also obtains direct links to access related productivity entities that are otherwise accessible through different productivity systems. In this way, as described in further detail in the examples below, the calendar system 101 can provide a unified view user interface in which other information regarding other productivity entities relating to an event (which are stored as separate productivity entities and, optionally, include one or more entities that are not event type entities), is provided in a user interface in an integrated manner.

Although the example of FIG. 4 is described as including embedded details for only one productivity entity type and then including links to other productivity entities, in some other implementations, a productivity entity container may be configured to include embedded (i.e., directly stored as compared to a link) data for different productivity entities, different productivity entity types, or a combination thereof in addition to including one or more links to the other productivity entities.

Figure 5:
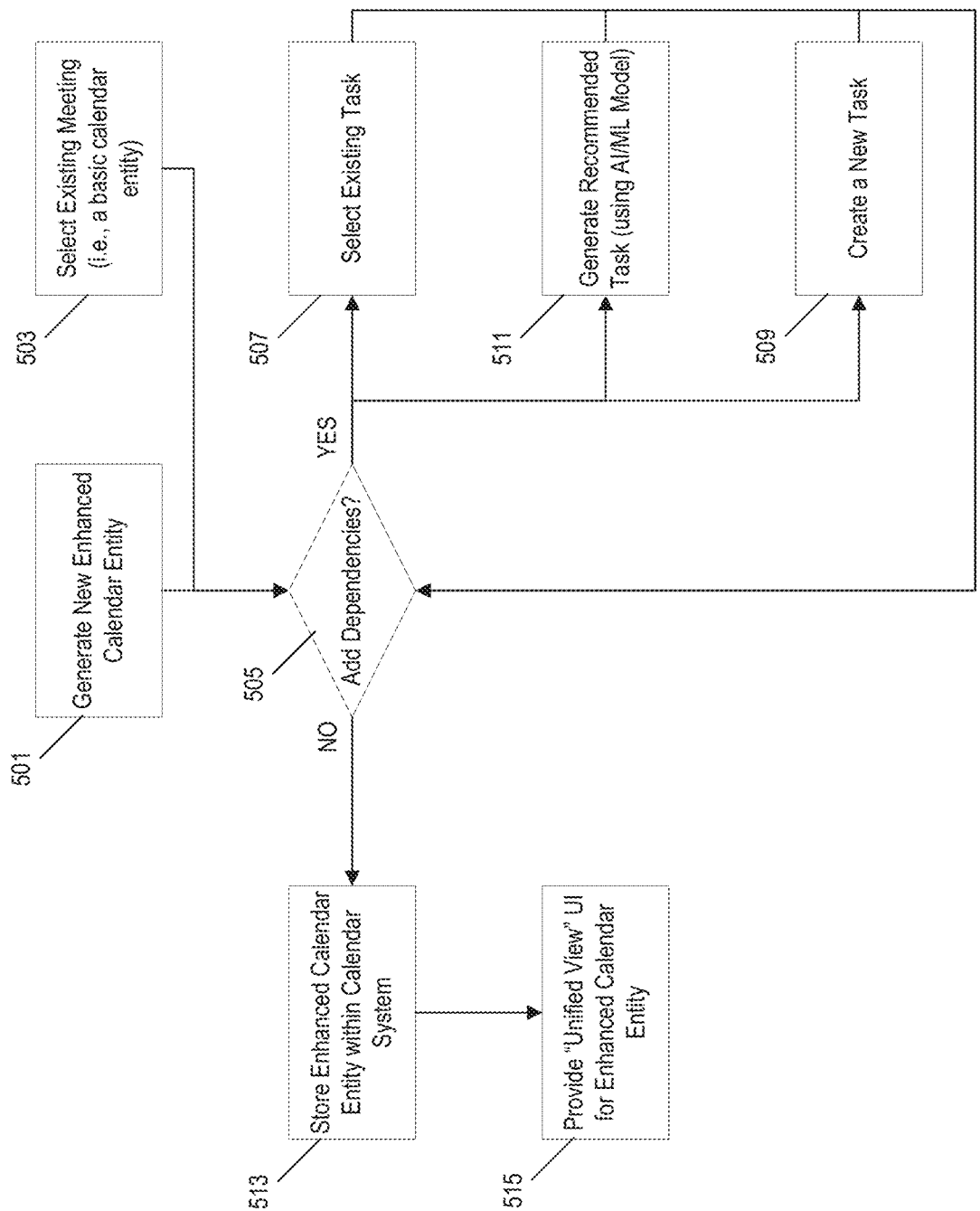
FIG. 5 is a flowchart illustrating a method of generating the calendar entity container of FIG. 4.

FIG. 5 is a flow chart illustrating an example of a method for creating a new calendar entity container 401 through a productivity software application interface. This example is described with respect to the calendar system 101 and, in particular, with reference to an event-type productivity entity. However, it should be understood that a similar method can be performed within a different type of productivity system and for different types of productivity entity containers and the method is provided merely as an example. For example, although the example of FIG. 5 and some other examples described below are described with respect to a calendar entity container, in some implementations, productivity entity containers of other types may be similarly created and utilized including, for example, a task entity container (in which dependencies might include one or more calendar events relating to a particular task, one or more users associated with the task, one or more document or data files related to the task, or a combination thereof) or a data/content entity container. Similarly, although several examples described herein describe mechanisms for providing a unified view of the associated productivities entities through the calendar system 101, in some implementations, other productivity systems may be similarly configured to provide a unified view user interface in which details relating to different associated productivity entities of different productivity entity types are included and accessible in the same user interface.

Also, it should be understood that the functionality described with respect to FIG. 5 can be performed in whole or in part by the user device 111, 121. For example, in some embodiments, an application executed on the user device 111, 121 is configured to perform all or a part of the functionality described below with respect to FIG. 5 and, in general, the functionality described herein with respect to creating, storing, accessing, and editing a productivity entity container as described herein.

In the example of FIG. 5, the new calendar entity container 401 can be created by generating a new event within the calendar system 101 (block 501) or by selecting an existing event within the calendar system 101 and promoting the selected event from a basic calendar entity (i.e., one that contains event details, but does not include links to or data associated with other productivity entities) to a calendar entity container (block 503).

In response to creating the new calendar entity container, the calendar system 101 prompts the user to add one or more dependencies for the new calendar entity container (block 505). In this example, a dependency is another productivity entity that is to be associated with the new or promoted calendar entity container including, for example, a task-type productivity entity. The example of FIG. 5 illustrates various mechanisms by which a task-type productivity entity can be added as a dependency of the calendar entity container. For example, a task can be added as a dependency by receiving a selection from a user through a user interface by selecting an task from a list of existing task-type productivity entities (block 507) or by the user manually creating a new task (block 509). To access existing tasks, the calendar system 101 can be configured to communicate with the task system 103 to access one or more tasks associated with the user creating the new calendar entity container. In some embodiments, the calendar system 101 can also be configured to communicate with the task system 103 when a user creates a new task to link to the calendar entity container (e.g., such as by prompting the user for data for the new task and passing the collected data to the task system 103 for creation and storage of a new task, such as, for example, through an application programming interface (API) associated with the task system 103).

Alternatively (or additionally), in some implementations, the calendar system 101 is configured to automatically generate a listing of one or more recommended tasks to add as dependencies for the new event (block 511). In some such implementations, the calendar system 101 can be configured to analyze the event details to assess the nature of the event (e.g., a project status update meeting, a planning meeting, a review meeting, etc.) and, based on this information, automatically generate a list of recommended tasks using, for example, a trained artificial intelligence/machine learning model. Again, the calendar system 101 (and or the application software for the calendar system 101) can be configured to communicate with the task system 103 to identify, access, or both recommended tasks. For each recommended task, the calendar system 101 prompt the user (through one or more user interfaces) to either (a) approve assigning the recommended task as a dependency (b) decline assigning the recommended task as a dependency.

After the user has selected or otherwise created one or more dependencies for the new event, the new calendar entity container 401 is stored (e.g., within the calendar system 101) (block 513) and, when the user accesses the calendar system 101 through the productivity software application on the user device 111, 121, information for the event and the other productivity entities that have been associated with the calendar event as dependencies can be included in one or more user interfaces provided within the calendar system 101 (block 515).

It should be understood that the although the example of FIG. 5 describes adding task-type productivity entities as dependencies to a new calendar entity container, in various implementations, each of the productivity systems 101, 103, 105, 107, 108 may be configured to automatically, semi-automatically, manually (through user selections), or a combination thereof add dependencies of various productivity entity types to a productivity entity container including, for example, stored content from the data/content storage system 107, emails from the messaging system 108, and participant contact information from the directory services system 105. Furthermore, in some implementations, a productivity system (e.g., productivity systems 101, 103, 105, 107, 108) may be configured to define a limit of the number of other productivity entities that can be added as dependencies while, in other implementations, any number of dependencies can be assigned. Additionally, although the example of FIG. 5 describes a method for creating anew calendar entity container, similar methods may be used to edit an existing calendar entity container, such as, for example, to add or change the assigned dependencies or other data stored within the container.

As noted above, the productivity systems configured to create, utilize, and manage productivity entity containers (such as those described in FIGS. 3 and 4) are also configured to present a unified view in which information for multiple associated productivity entities are included together within a single user interface. Accordingly, with the benefit of entity linking provided via a productivity entity container, productivity systems (or applications executed by the user device 111, 121 to access the productivity systems) in some implementations may be configured to perform other additional functions that are not currently possible in productivity systems in which productivity entities are separately stored and managed by productivity entity type. For example, the calendar system 101 may be configured to include in the provided user interface an indication of a current status of one or more tasks that are assigned as dependencies for a scheduled meeting and can also be configured to automatically reschedule a meeting based on the status of one or more associated tasks.

Figure 6:
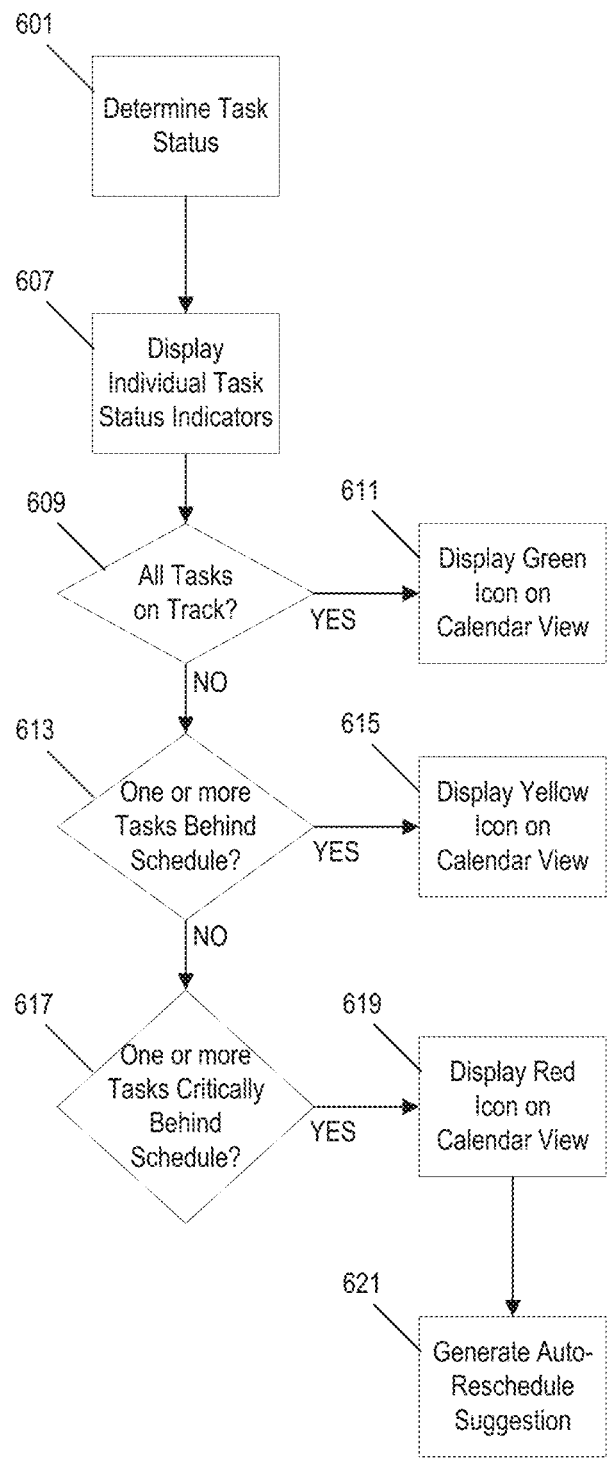
FIG. 6 is a flowchart illustrating a method of providing a user interface in a calendar system using the calendar entity container of FIG. 4.

FIG. 6 is a flowchart illustrating an example method for including task status information in a unified view interface and also for rescheduling an event (e.g., a meeting) based on task status. As discussed above with respect to FIG. 5, the method of FIG. 6 is described with respect to the calendar system 101. However, it should be understood that similar functionality may be performed by other of the productivity systems 103, 105, 107, 108 for various types of productivity entities and, similarly, all or a part of the functionality described with respect to FIG. 6 can be performed by a software application executed by a user device 111, 112 interacting with one of the productivity systems 101, 103, 105, 107, 108.

In the example of FIG. 6, the calendar system 101 is configured to determine a status of each task assigned as a dependency for the scheduled meeting (block 601), for example, by using the link to the task-type productivity entity in the calendar entity container to access the task-type productivity entity within the task system 103. Information about each task (e.g., a task name and the identity of the user responsible for the task) and a graphical status bar indicator showing an indication of the current status/progress of each task are included in an event view interface (as discussed in further detail below in reference to FIG. 8) (block 603).

In some implementations, the calendar system 101 is also configured to include in the user interface a status indicator indicative of an overall, collective status of the tasks associated with the scheduled meeting. For example, as illustrated in the example of FIG. 6, if all tasks are completed or are on pace to be completed before the scheduled meeting (block 609), then a green icon is provided next to the meeting details in the calendar view interface (block 611). If one or more tasks are currently behind schedule (block 613), a yellow icon is provided next to the meeting details in the calendar view interface (block 615). Also, if one or more of the associated tasks is critically behind schedule (e.g., the task can no longer possibly be completed before the meeting based on a current date and time, a date and time of the scheduled meeting, and metadata associated with the task) (block 617), a red icon is provided next to the meeting details in the calendar view interface (block 619).

In some implementations, when the calendar system 101 determines that one or more of the associated tasks is critically behind schedule and cannot be completed before the scheduled meeting, the calendar system 101 automatically generates an auto-reschedule suggestion suggesting to the user that the meeting be rescheduled so that the one or more tasks can be completed before the meeting (block 621). In some implementations, the calendar system 101 is configured to access the calendar information for participants associated with the scheduled meeting and identify one or more dates and one or more times where all or a predetermined percentage of the meeting participants are available. In some implementations, the calendar system 101 is configured to automatically provide a prompt to the user (e.g., as a notification, an email, a pop-up window within the calendar system 101, or the like) advising the user that one or more tasks will not be completed before the meeting, presenting one or more recommended options for rescheduling the meeting, and prompting the user to approve or reject the proposed rescheduling. In other implementations, the calendar system 101 may be configured to (or selectively configured based on user settings or details of the calendar event-type productivity entity) to automatically reschedule the meeting without requiring user approval.

In some implementations, the calendar system 101 may be configured to evaluate the status of the associated tasks periodically, each time the meeting is to be included in the user interface, or both. Similarly, in some implementations, the calendar system 101 is configured to evaluate the status of associated tasks only after a predetermined date (e.g., as defined by user preference or as a setting selected when the user creates the new event-type productivity entity). However, in some implementations, the calendar system 101 is configured to evaluate the status of tasks associated with an event periodically or at defined dates or times independent of whether the calendar interface is provided. In some such implementations, the calendar system 101 may be configured to transmit a notification to an event organizer, an event meeting participant, or both (e.g., as a notification provided via the user device or an email sent to the user) indicating that a task is behind schedule (or critically behind schedule) and, optionally, notifying the one or more users of the auto-reschedule suggestion.

In some implementations, the status of a task-type productivity entity is updated manually by the user to which the task is assigned. Accordingly, the task status may be somewhat subjective and may not be up-to-date in some implementations and situations. Therefore, in some implementations, the calendar system 101 is configured to send a notification to the user that is assigned to a task instructing them to update the task in response to the system determining that the task is behind schedule.

In some implementations, the calendar system 101 is configured to determine whether a task is "on track," "behind schedule," or "critically behind schedule" using a status assessment that is assigned to the task by the task system 103. For example, in some implementations, the status of a particular task is selected manually by the user to which the task is assigned and the task status is then stored to the task system 103 in the task-type productivity entity container. In other implementations, the calendar system 101 may be configured to apply its own criteria for evaluating the status of a task. For example, in some implementations, the system may be configured to assign a "behind schedule" status to a task when the task is not completed by a first defined date (e.g., one week before start of the associated event) and to assign a status of "critically behind schedule" to the task when the task is still not completed by a second, later, defined date (e.g., the day before the start of the event).

Figure 7:
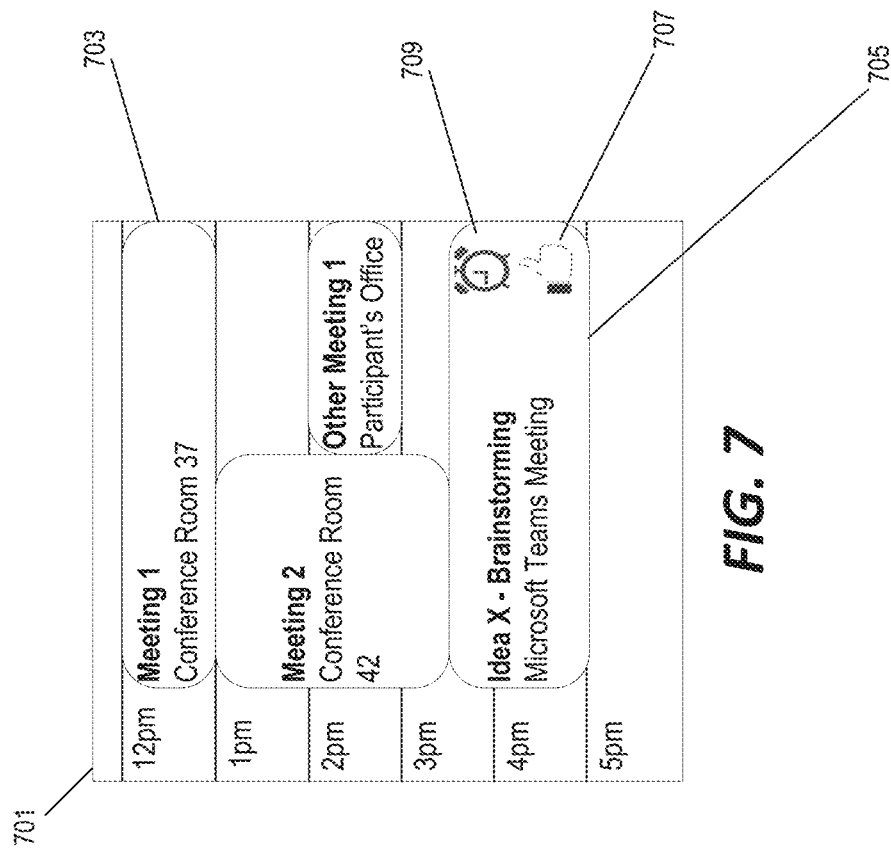
FIG. 7 is an example of a calendar view user interface including multiple calendar entities based on the calendar entity container of FIG. 4.
Figure 8:
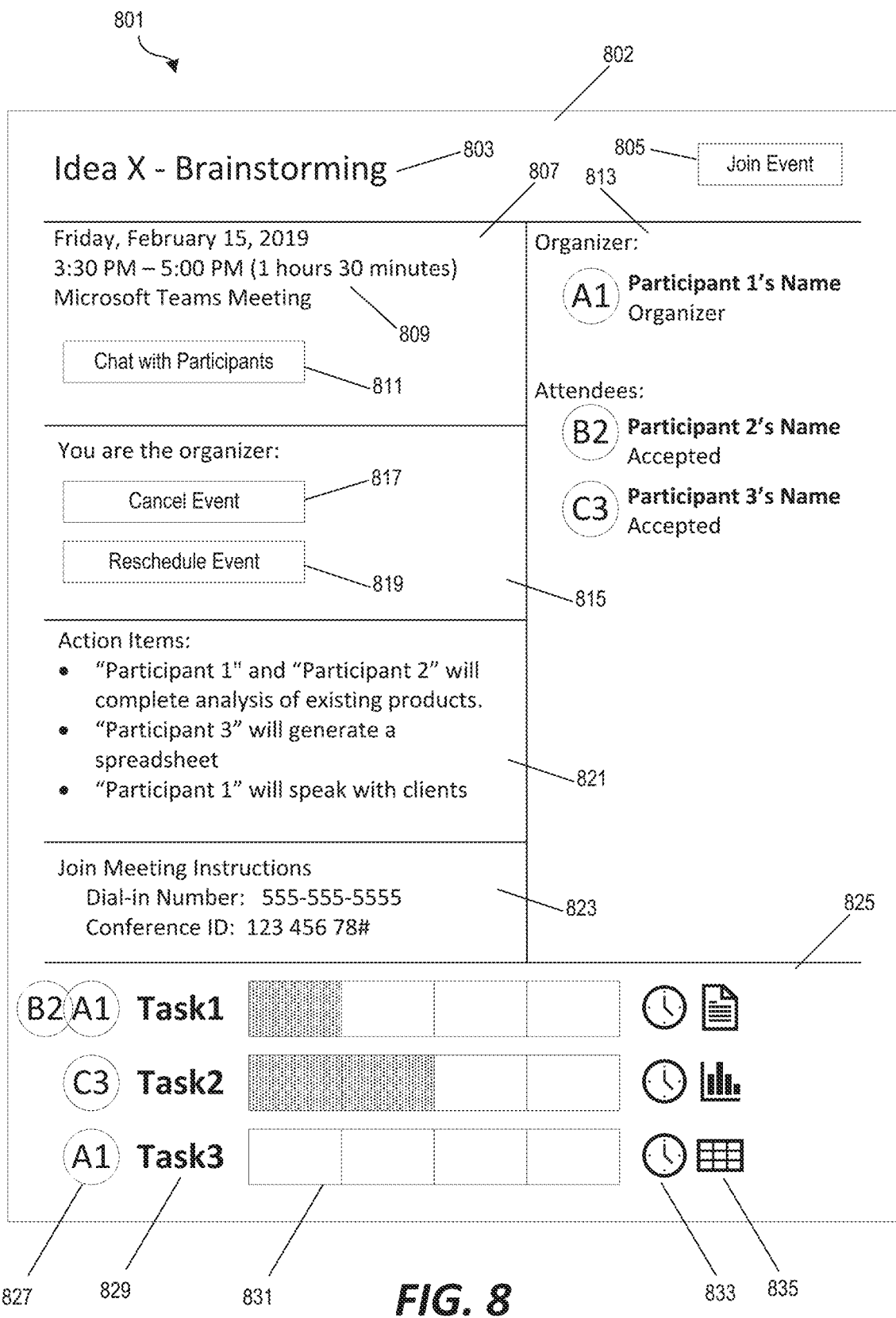
FIG. 8 is an example of an event view user interface including details for a single event based on the calendar entity container of FIG. 4.

FIGS. 7 and 8 illustrate examples of a unified view for a calendar entity container as included within the calendar interface provided by the calendar system 101. For example, FIG. 7 is an example of a calendar view user interface 701 presenting a graphical representation of a user's schedule for a period of time (in this example, during the afternoon of a single day). Each box included within the calendar view user interface 701 corresponds to a different calendar event entity, wherein the vertical height of the box indicates the scheduled duration of the event, and the position of the box within the calendar view user interface 701 indicates the times at which the event is scheduled to begin and end. A title of the event and a location of the event can also be included in the calendar view user interface 701 as text within each box. Or, when the event is a remote or virtual event (e.g., conducted via video conferencing, teleconferencing, or another virtual meeting platform), the box identifies the communication platform for the meeting (e.g., instead of listing a meeting location). For example, box 703 represents an event titled "Meeting 1" scheduled to be held in "Conference Room 37" from 12:00 PM until 1:00 PM.

In the example of FIG. 7, the calendar view interface includes an indication of events that are defined as basic calendar event entities (such as, for example, box 703) as well as events that are defined by calendar entity containers. Box 705 is an example of a unified view presentation of information indicative of multiple productivity entities linked by a productivity entity container shown within the calendar view user interface 701. Like the other events within the calendar view user interface 701, the box 705 for the calendar entity container includes a text description of the event title (i.e., "Idea X—Brainstorming") and the event location or the communication platform to be used (i.e., "Microsoft Teams Meeting"). The box 705 for the calendar entity container also includes additional information regarding the other productivity entities that are associated (i.e., linked) with the embedded event within the calendar entity container (e.g., tasks that have been assigned as dependencies to the calendar entity container).

In the example of FIG. 7, this additional information regarding the dependencies is provided in the form of color-coded icons. For example, a first task status icon 707 indicates tasks associated with an event assigned to the user currently viewing the user interface (e.g., "my tasks") and is color-coded to be indicative of the overall, collective status of the tasks associated with the event that are assigned to the user. The user currently viewing the user interface can be determined from log-in information provided to the calendar system 101 from the user device 111, 121. In this particular example, the first task status icon 707 is color-coded green when all tasks assigned to the user are either completed or are on track to be completed before the event, is color-coded yellow when one or more tasks assigned to the user are behind schedule, and is color-coded red when one or more tasks assigned to the user will not be completed before the event, as described above with respect to FIG. 6. In some implementations, when the tasks associated with the event (as specified by links within the productivity entity container) do not include any tasks assigned to the user currently viewing the user interface, the first task status icon 707 is not included within the calendar view user interface 701.

Similarly, a second task status icon 709 can be included within the user interface that indicates tasks associated with the event are assigned to other users (e.g., users other than the user viewing the calendar view user interface). Like the first task status icon 707, the second task status icon 709 can be color-coded to indicate of the overall, collective status of the tasks associated with the scheduled meeting that are assigned to other users. For example, the second task status icon 709 is color-coded green when all tasks assigned to others are either completed or are on track to be completed before the event, is color-coded yellow when one or more tasks assigned to others are behind schedule, and is color-coded red when one or more tasks assigned to others will not be completed before the event, as described above with respect to FIG. 6. In some implementations, when the tasks associated with the event (as specified by links within the productivity entity container) do not include any tasks assigned to other users, the second task status icon 709 is not included within the calendar view user interface 701.

FIG. 8 illustrates an example of an event view interface 801 that shows additional detailed information for an individual event. In some implementations, the calendar system 101 is configured to provide the event view interface in response to receiving a selection from the user of an event within the calendar view interface (e.g., by double-clicking a box corresponding to the event in the calendar view interface). The example of FIG. 8 shows an event view interface provided in response to receiving a selection from the user of the box 705 in the calendar view interface example of FIG. 7.

A first section 802 of the event view interface 801 is positioned along a top edge of the interface and includes a title 803 of the event. Also positioned in the top-right corner of the event view interface 801 is a join event button 805. In response to receiving a user selection of the join event button 805 (e.g., at the scheduled time of the event), the calendar system 101 launches a virtual meeting system where the event is taking place (e.g., using a link included in the event details).

A second section 807 of the event view interface 801 is positioned in a first column and include text description 809 of the event including, for example, the date, time, length, and location of the event. The second section 807 also includes a chat button 811. In response to receiving a user selection of the chat button 811, the calendar system 101 launches a text chat window accessible by one or more users, such as one or more participants of the event. For example, the text chat window can be used for communications between meeting participants before, during, or after a meeting.

A third section 813 of the event view interface 801 is positioned in the example of FIG. 8 as a second column and provides a list of event participants and a graphical indicator (e.g., an avatar, a picture, etc.) representing each participant. In the example of FIG. 8, this third section identifies "Participant 1" as the meeting organizer and identifies "Participant 2" and "Participant 3" as other users attending the event. In some implementations, the calendar system 101 is configured to receive a user selection of one of the participants listed in the third section 813 and, in response to receiving the selection, is configured to provide a user interface including contact information for the selected participant. The calendar system 101 may be configured to access this information from a directory services system 105 through a link to a contact-type productivity entity assigned as a dependency in the calendar entity container. In some implementations, a user can send an email to one or more event participants by selecting that participant's name in the third section 813 of the event view interface 801.

When the user viewing the event view interface 801 is the meeting organizer, a fourth section 815 is included in the event view interface 801 including one or more buttons for various scheduling options available to the meeting organizer. In the example of FIG. 8, the fourth section 815 includes a cancel event button 817 and a reschedule event button 819.

A fifth section 821 includes a textual description of the event such as, for example, a meeting agenda. In the example of FIG. 8, the fifth section 821 includes a textual list of action items to be discussed during the meeting and action items to be completed prior to the meeting.

A sixth section 823 includes alternative instructions for joining the event. For example, in the example of FIG. 8, a user can join the event by selecting the join event button 805 through the event view interface 801 or by dialing or selecting the number listing in the sixth section 823.

The event view interface 801 in the example of FIG. 8 also includes a task status section 825 (e.g., along the bottom of the event view interface 801). In the example of FIG. 8, three tasks have been assigned as dependencies in the calendar entity container. For each task associated with the event in the calendar entity container, the event view interface 801 includes a graphical indicator 827 (e.g., a picture or avatar) of the user to which the task is assigned and a brief text description of the task 829. In some implementations, a single task may be assigned to multiple users and, in such situations, the event view interface 801 may include multiple graphical indicators 827 next to the brief text description of the task 829. For example, as in FIG. 8, "Task2" and "Task3" are each assigned to one user ("Participant 3" (C3) and "Participant 1" (A1), respectively) and, therefore, display only a single graphical indicator 827 next to each brief task description 829. However, "Task1" is assigned to both "Participant 1" (A1) and "Participant 2" (B2) and, therefore, displays two graphical indicators 827 identifying both users to which the task is assigned.

The event view interface 801 also includes, for each task, a status indicator 831 indicating a current status of the corresponding task. In the example of FIG. 8, the status indicator 831 for each task is provides as a segmented progress bar where successive segments in the progress bar are filled in to indicate a degree to which the task has progressed. As described above in reference to FIG. 6, the calendar system 101 is configured to determine a status of each task by accessing the task-type productivity entity from the task system 103 through a link to the task that has been included as a dependency in the calendar entity container, wherein the progress bar status indicator 831 is provided with an appropriate number of segments filled in to represent the determined status of the corresponding task.

The task status section 825 also includes a plurality of buttons linking to other information, productivity entities, documents, or the like relating to the task. In the example of FIG. 8, a task status icon 833 is provided for each task. In some implementations, the calendar system 101 may be configured to use color-coding of the task status icon 833 to indicate a status of the corresponding task (similar to the color-coding of the task status icons 707, 709 in the example of FIG. 7). Furthermore, in some implementations, the calendar system 101 is configured to, in response to detecting a user selection (e.g., a double-click) of the task status icon 833, open an additional user interface (e.g., a new window) where a user can edit details relating to the corresponding task. Using the links to the individual task entities provided by the productivity entity container, the calendar system 101 is configured to store changes made to individual tasks in this way directly in the corresponding task-type productivity entity stored on the task system 103.

The event view user interface 801 also provides one or more document buttons 835 for documents stored on the data/content storage system 107 related to the task. The calendar system 101 in this example is configured to, in response to receiving the selection, access the document associated with the task. The calendar system 101 is configured to access the document from the data/content storage system 107 through a link to the document assigned as a dependency in the calendar entity container.

Figure 9:
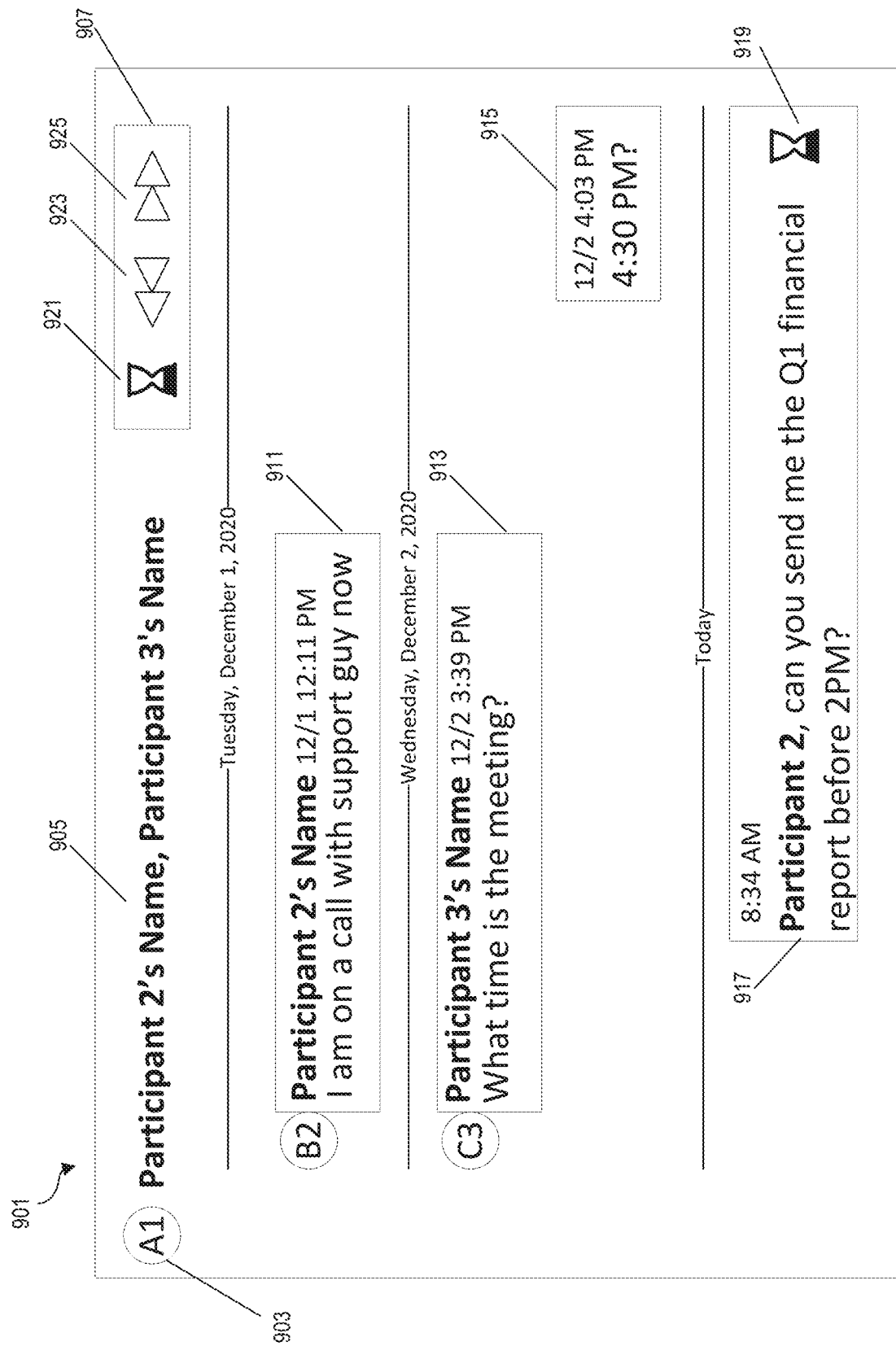
FIG. 9 is an example of a chat log view user interface including chat messages based on the productivity entity container of FIG. 3.

FIG. 9 illustrates another example of a unified interface. The user interface 901 illustrated in FIG. 9 allows users to exchange messages in a chronologically displayed format. The top of the user interface 901 identifies the user currently viewing the user interface 901 (the user using or logged into the messaging system 108 through the user device 111, 121) by including a graphical indicator 903 (e.g., a picture or avatar) of the user. The user interface 901 also lists the names of other users 905 that are currently included as participants of the event. These users are able to view messages posted by other users and also post their own messages in the chat sequence. The user interface 901 also includes a task navigation panel 907, which will be described in further detail below.

A sequence of individual chat messages 911, 913, 915, 917 are included within the user interface 901, wherein the individual chat messages are provided chronologically in the order in which they were received so that the most recent messages in the chat sequence appear at the bottom of the screen. Chat messages 911, 913 sent by other users (i.e., users other than the current user of the device) are left-justified on the user interface 901 and are provided with the name, a graphical indicator, or both of the user that sent the message, the date/time at which the message was sent/received, and the body of the message (e.g., text, one or more images, etc.). Chat messages 915, 917 sent by the current user of the device are right-justified to distinguish between messages sent by the user and messages received from other users.

In some implementations, the sequence of chat messages is included as a part of a single chat-type productivity entity container. In other implementations, each individual chat message corresponds to a separate individual message-type productivity entity. In this latter example, a chat-type productivity container may be created and utilized to include links to each individual message-type productivity entity. With these links, the messaging system 108 providing the user interface 901 accesses the chat-type productivity entity container, accesses the links to individual message-type productivity entities included in the chat-type productivity entity container, and retrieves and provides the individual messages as a sequence based on the linked message-type productivity entities.

In some implementations, the chat-type productivity entity container or individual message-type productivity entities can also be associated with other productivity entities of other productivity entity types. For example, in the example of FIG. 9, a task-type productivity entity has been associated with the chat message 917 by a link to the task-type productivity entity that is included in the message-type productivity entity container or the chat-type productivity entity container. In this situation, a task status icon 919 is included within the user interface 901 alongside the message to which the task-type productivity entity has been associated. As discussed in reference to the other examples above, the task status icon 919 can be color coded such that the color of the task status icon is indicative of the status of the task (e.g., a green task status icon 919 indicates that the task is completed, a yellow task status icon 919 indicates that the task is in-process, and a red task status icon 919 indicates that the task is critically behind schedule). As also described above, in some embodiments, different icon, shapes, images, colors, or combinations thereof can be included in the user interface 901 to indicate whether the task corresponding to the task status icon 919 has been assigned to the user of the device or to a different user.

In some implementations, the portion of the user interface 901 including the sequence of messages is scrollable so that a user can view earlier messages in the sequence while a header bar (including, for example, the graphical indicator 903 of the user, the list of other users 905 included in the chat, and the task navigation panel 907) remain stationary at the top of the user interface 901 while the user scrolls through the messages. In this example, the task navigation panel 907 includes a task status icon 921, a fast-backward button 923, and a fast-forward button 925 to assist the user in navigating to tasks that have been associated with particular messages in the chat.

The task status icon 921 is color-coded based on the collective status of all tasks associated with messages in the chat. For example, in some implementations, the task status icon 921 is green when all tasks that are associated with messages in the chat have been completed, is yellow when one or more associated tasks is not yet completed, and is red when one or more associated tasks are determined to be behind schedule. In response to a user selection of the fast-backward button 923, the user interface 901 automatically scrolls the sequence of chat messages to the next sequentially previous message to which a task is associated. Similarly, in response to a user selection of the fast-forward button 925, the user interface automatically scrolls the sequence of chat messages to the next sequentially subsequent message to which a task is associated.

Accordingly, as illustrated in the examples above, by using productivity entity containers that link different productivity entities (e.g., of different productivity entity types), productivity systems can be configured to provide a unified view in which user interfaces designed primarily for viewing and management of one type of productivity entity can also present information related to different productivity entities of other productivity entity types. For example, a chat messaging user interface can be adapted to simultaneously present information relating to tasks, emails, calendar appointments, etc. associated with a particular sequence of chat messages. Similarly, a calendar system user interface can be adapted to also simultaneously present information relating to task, emails, chat messaging sequences, etc. associated with a particular calendar event.

As illustrated in the examples of FIGS. 7, 8, and 9, by using the information and links to other productivity entities included in the productivity entity container, methods and systems described here provide relevant information for different productivity entity types in a unified view user interface. Accordingly, the various different examples described above provide systems and methods for creating, storing, and using a productivity entity container that includes details for a particular productivity entity, one or more links to productivity entities of different productivity entity types, or a combination thereof, wherein the productivity entity container is used by productivity systems to provide a unified view interface for viewing, interacting, and managing different productivity entities of different productivity entity types.

Various features and advantages of some embodiments are set forth in the following claims.

What is claimed is:

1. A method of operating a computer-based productivity system by linking associated productivities entities of different productivity entity types, the method comprising:
    creating, by a computer processor, a first productivity entity data structure accessible via a first productivity service, the first productivity entity data structure comprising
        information for a first productivity entity, wherein the first productivity entity is of a first productivity entity type;
    creating, by the computer processor, a second productivity entity data structure accessible via a second productivity service different from the first productivity service, the second productivity entity data structure comprising information for the second productivity entity, wherein the second productivity entity is of a second productivity entity type, wherein the first productivity entity type is different than the second productivity entity type;
    adding a link for the second productivity entity to the first productivity entity data structure;
    storing the first productivity entity data structure,
    accessing, with the first productivity service, the first productivity entity data structure;
    accessing, with the first productivity service, the second productivity entity data structure using the link to the second productivity entity included in the first productivity entity data; and
    providing, by the first productivity service, a user interface of the first productivity service, the user interface including information indicative of the first productivity entity and information indicative of the second productivity entity without launching a user interface environment of the second productivity service,
    wherein the first productivity entity type and the second productivity entity type are each selected from a group consisting of a calendar productivity entity type corresponding to an event, a task productivity entity type corresponding to a task assigned to a user, a message productivity entity type corresponding to a message sent from one user to another user, and a data content productivity entity type corresponding to a stored data file.

2. The method of claim 1, wherein the first productivity entity is a calendar event-type productivity entity, and the information for the first productivity entity included in the first productivity entity data structure comprises details of an event including a date of the event, a time of the event, and a location of the event.

3. The method of claim 1, wherein the second productivity entity is a task-type productivity entity, and wherein providing the user interface of the first productivity service comprises providing at least one icon in the user interface of the first productivity service, the at least one icon indicating that at least one task-type productivity entity is associated with the first productivity entity.

4. The method of claim 3, wherein providing the at least one icon in the user interface of the first productivity service comprises:
    providing a first icon in the user interface of the first productivity service, the first icon indicating that a first task-type productivity entity of the at least one task-type productivity entity associated with the first productivity entity is assigned to a first user, and
    providing a second icon in the user interface of the first productivity service, the second icon indicating that a second task-type productivity entity of the at least one task-type productivity entity associated with the first productivity entity is assigned to a second user.

5. The method of claim 3, further comprising determining a progress status of a task corresponding to the second productivity entity, and wherein providing the user interface of the first productivity service comprises providing the icon color-coded to indicate the determined progress status of the task.

6. The method of claim 1, wherein the second productivity entity is a task-type productivity entity, the method further comprising determining a progress status of a task corresponding to the second productivity entity, wherein providing the user interface of the first productivity service comprises providing a segmented progress bar in the user interface of the first productivity service, wherein a number of segments of the segmented progress bar are filled based on the determined progress status of the task corresponding to the second productivity entity.

7. The method of claim 1, wherein the second productivity entity is a first task-type productivity entity, wherein the first productivity entity data structure includes links to a plurality of task-type productivity entities, and wherein providing the user interface of the first productivity entity comprises:
    determining a progress status of each task of a plurality of tasks; and
    providing a plurality of progress bars in the user interface of the first productivity service, each progress bar of the plurality of progress bars corresponding to a different one of the plurality of tasks, wherein each progress bar of the plurality of progress bars provided in the user interface graphically indicates the determined progress status of the task corresponding to the progress bar.

8. The method of claim 1, wherein the first productivity entity is a calendar-type productivity entity corresponding to an event, and wherein the second productivity entity is a task-type productivity entity corresponding to a task associated with the event, the method further comprising:
    determining, by the computer processor, a progress status of the task based on the accessed second productivity entity;
    determining, by the computer processor based on the progress status of the task, whether the task is on schedule to be completed before the event; and
    automatically generating and providing a notification to a user to reschedule the event in response to determining, based on the progress status of the task, that the task is not on schedule to be completed before the event as currently scheduled.

9. The method of claim 1, wherein adding a link to the second productivity entity to the first productivity entity data structure comprises:
    accessing the information of the first productivity entity;

generating, using a machine learning model, a list of one or more recommended productivity entities of one or more different productivity entity types; and in response to receiving a selection of one of the one or more recommended productivity entities as the second productivity entity, adding the link for the second productivity entity to the first productivity entity data structure.

10. The method of claim 1, wherein the link for the second productivity entity added to the first productivity entity data structure comprises an identifier of the second productivity service.

11. The method of claim 1, further comprising:

in response to detect a user selection of an icon representing the second productivity entity within the user interface, receive, by the first productivity service, a change to the second productivity entity and use the link included in the first productivity entity data structure to store the change to the second productivity data structure.

12. A computer-based system for linking associated productivity entities of different productivity entity types, the computer-based system comprising:

a computer-readable memory storing instructions associated with a first productivity service; and an electronic processor coupled to the computer-readable memory and configured, via execution of the instructions, to:

create a first productivity entity data structure, the first productivity entity data structure comprising
information for a first productivity entity, wherein the first productivity entity is of a first productivity entity type, and
a link to a second productivity entity, wherein the second productivity entity is of a second productivity entity type, wherein the first productivity entity type is different than the second productivity entity type and wherein the second productivity entity is accessible via a second productivity service;

store the first productivity entity data structure,
access the first productivity entity data structure;
access the second productivity entity data structure using the link to the second productivity entity included in the first productivity entity data; and
provide a user interface of the first productivity service, the user interface including information indicative of the first productivity entity and information indicative of the second productivity entity without launching a user interface environment of the second productivity service.

13. The computer-based system of claim 12, wherein the first productivity entity is a calendar event-type productivity entity, and the information data for the first productivity entity included in the first productivity entity data structure comprises details of an event including a date of the event, a time of the event, and a location of the event.

14. The computer-based system of claim 12, wherein the electronic processor is further configured, via execution of the instructions to:

determine a progress status of a task corresponding to the second productivity entity; and provide a progress bar in the user interface of the first productivity service graphically indicating the determined progress status of the task corresponding to the second productivity entity.

15. The computer-based system of claim 12, wherein the first productivity entity is a calendar-type productivity entity corresponding to an event, wherein the second productivity entity is a task-type productivity entity corresponding to a task associated with the event, and wherein the electronic processor is further configured, via execution of the instructions to:

determine a progress status of the task based on the accessed second productivity entity;

determine, based on the progress status of the task, whether the task is on schedule to be completed before the event; and automatically generate and provide a notification to a user to reschedule the event in response to determining, based on the progress status of the task, that the task is not on schedule to be completed before the event as currently scheduled.

* * * * *